(12) United States Patent
Shoji et al.

(10) Patent No.: US 7,262,421 B2
(45) Date of Patent: Aug. 28, 2007

(54) PRODUCTION METHOD OF RADIATION IMAGE CONVERSION PANEL

(75) Inventors: Takehiko Shoji, Hachioji (JP); Osamu Morikawa, Hachioji (JP); Shinji Kudo, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 17 days.

(21) Appl. No.: 11/230,827

(22) Filed: Sep. 21, 2005

(65) Prior Publication Data
US 2006/0065850 A1    Mar. 30, 2006

(30) Foreign Application Priority Data
Sep. 24, 2004   (JP) ............................. 2004-277000

(51) Int. Cl.
*G03B 42/08*   (2006.01)
(52) U.S. Cl. ................................. 250/484.4

(58) Field of Classification Search ............. 250/484.4
See application file for complete search history.

(56) References Cited

U.S. PATENT DOCUMENTS 6,730,919 B2 *   5/2004   Shoji et al. ............. 250/484.4

FOREIGN PATENT DOCUMENTS

| JP | 2003-279696 A |   | 10/2003 |
|----|---------------|---|---------|
| JP | 2004205354 A  | * | 7/2004  |

* cited by examiner

*Primary Examiner*—Constantine Hannaher
(74) *Attorney, Agent, or Firm*—Finnegan, Henderson, Farabow, Garrett & Dunner, L.L.P.

(57) ABSTRACT

A method for producing a radiation image conversion panel containing the steps of: forming a stimulable phosphor layer on a substrate by a vapor deposition method to prepare a phosphor panel; hydrating the phosphor panel under a relative humidity of 30 to 60%; and sealing the phosphor panel with a moisture-proof protective film to prepare the radiation image conversion panel.

6 Claims, 3 Drawing Sheets

PRODUCTION METHOD OF RADIATION IMAGE CONVERSION PANEL

This application is based on Japanese Patent Application No. 2004-277000 filed on Sep. 24, 2004 in Japanese Patent Office, the entire content of which is hereby Incorporated by reference.

FIELD OF THE INVENTION

The present invention relates to a method for producing a radiation image conversion panel to be applied for forming a radiation image of an object and to a radiation image conversion panel.

BACKGROUND

A radiation image such as an X-ray image has been widely applied in the medical field for diagnosing a disease. Specifically, a radiation image obtained in combination of an intensifying paper and a film has been improved to achieve a high sensitivity and a high image quality during a long period of history and as the result, it is still now being used in the medical field of the world as an imaging system having a high reliability and a high cost performance. Recently, a computed radiography (CR) employing a stimulable phosphor panel has been commercialized and the improvements in sensitivity and image quality have been further continued.

The above mentioned stimulable phosphor panel accumulates radiation passed through an object and then, with irradiating the phosphor panel with exciting light, the phosphor panel emits stimulated light of which strength is corresponding to the dosage of accumulated radiation. The stimulable phosphor panel contains a substrate having thereon a laminated stimurable phosphor. One of the examples of a production method of a stimurable phosphor panel is disclosed in Patent Document 1, in which a stimulable phosphor layer is formed on a substrate followed by a thermal treatment. (refer to paragraphs 0034 and 0035).

When a stimulable phosphor layer formed on a substrate is subjected to a thermal treatment as described in Patent Document 1, the moisture in the crystal of the stimulable phosphor is removed, resulting in an increase in the amount of light emitted from the stimulable phosphor. However, the emitting amount of the light is not fully increased only by conducting a heat treatment and it may be possible that the sharpness of the image is not fully enough or the luminance of the phosphor may be lowered.

Patent Document 1: Japanese Patent Publication Open to Public Inspection (hereafter referred to as JP-A) No. 2003-279696

SUMMARY OF THE INVENTION

An object of the present invention is to provide a production method of a radiation image conversion panel in which sharpness of an image or luminance is improved and to provide a radiation image conversion panel.

One of the aspects of the present invention for attaining the above object is a method for producing a radiation image conversion panel containing the steps of: forming a stimulable phosphor layer on a substrate by a vapor deposition method to prepare a phosphor panel; hydrating the phosphor panel under a relative humidity of 30 to 60%; and sealing the phosphor panel with a moisture-proof protective film to prepare the radiation image conversion panel.

DESCRIPTION OF THE PREFERRED EMBODIMENT

The above object of the present invention is achieved by the following structures.

(1) A method for producing a radiation image conversion panel containing the steps of:
   forming a stimulable phosphor layer on a substrate by a vapor deposition method to prepare a phosphor panel;
   hydrating the phosphor panel under a relative humidity of 30 to 60%; and
   sealing the phosphor panel with a moisture-proof protective film to prepare the radiation image conversion panel.

(2) The method of Item (1) further containing the step of:
   dehydrating the phosphor panel by heating the phosphor panel at 60 to 160° C. after hydrating the phosphor panel.

(3) The method of Item (1) or Item (2) further containing the step of:
   heating the phosphor panel in an organic solvent gas before hydrating the phosphor panel.

(4) A method for producing a radiation image conversion panel containing the steps in the order named:
   (i) forming a stimulable phosphor layer on a substrate by a vapor deposition method to prepare a phosphor panel;
   (ii) heating the phosphor panel in air or in an inert gas;
   (iii) heating the phosphor-panel in an organic solvent gas;
   (iv) hydrating the phosphor panel under a relative humidity of 30 to 60%;
   (v) dehydrating the phosphor panel by heating the phosphor panel at 60 to 160° C.; and
   (vi) sealing the phosphor panel with a moisture-proof protective film to prepare the radiation image conversion panel.

(5) The method of Item (3) or Item (4), wherein the organic solvent is a nonflammable fluorine-containing solvent.

(6) A radiation image conversion panel produced by the method of any one of Items (1) to (5).

According to the embodiments of the present invention described in Items (1) to (6), the sharpness of an image and the luminance of the stimulable phosphor panel are improved.

The best mode of the present invention will now be explained using the figures. However, the present invention is not limited thereto.

Figure 1:
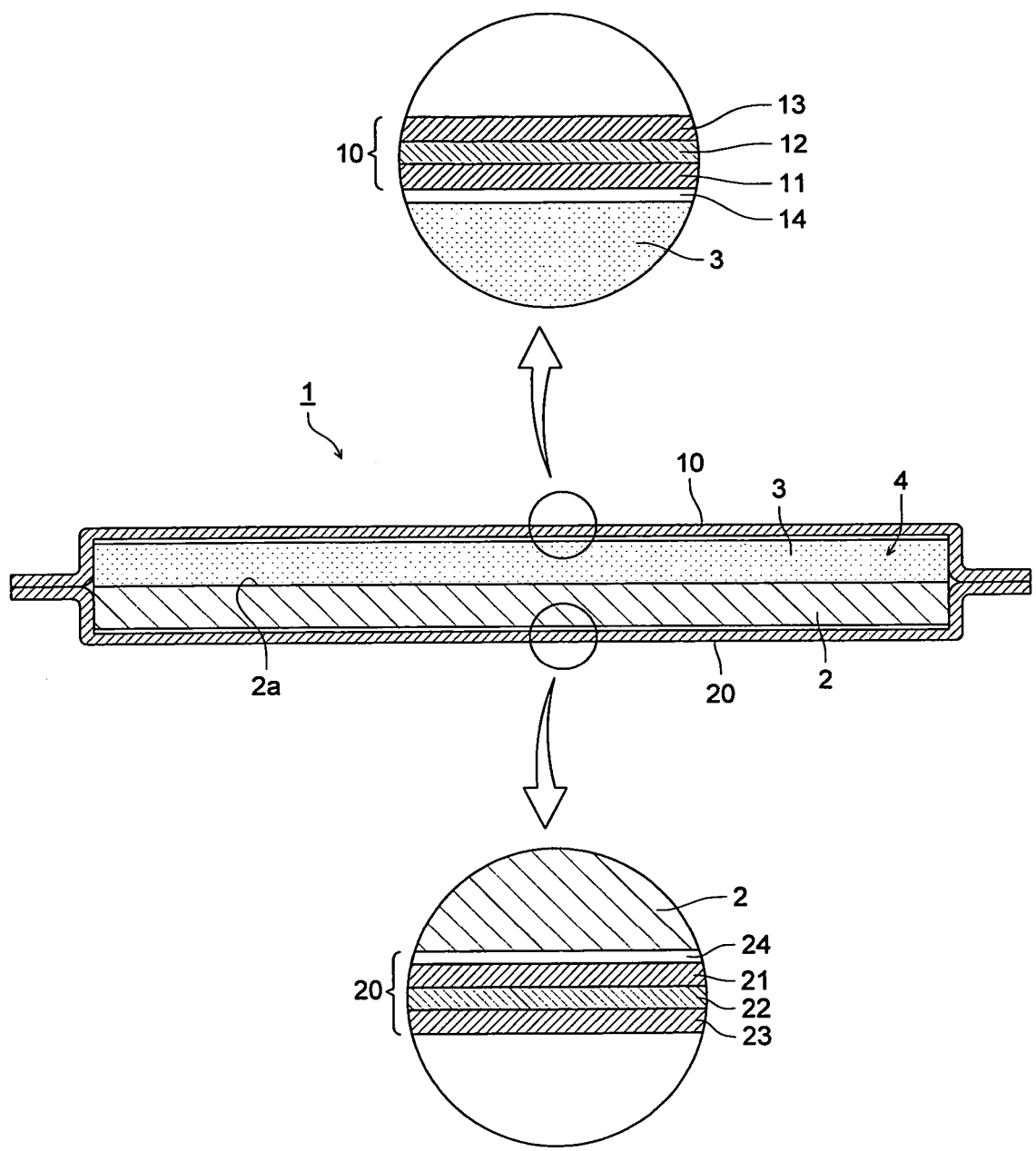
FIG. 1 is a cross-section view of radiation image conversion panel 1.

FIG. 1 shows a cross section view of radiation image conversion panel 1.

As is shown in FIG. 1, the radiation image conversion panel 1 has a phosphor panel 4 having a stimulable phosphor layer 3 provided on a substrate 2.

The substrate 2 has a rectangular shape. Example of a material Used for the substrate 2 include: polymer, glass or metal, and preferably include: a plastic film such as a cellulose acetate film, a polyester film, a poly(ethylene terephthalate) film, a polyamide film, a triacetate film or a polycarbonate film; a plate of glass such as quartz, borosilicate glass or chemically strengthen glass; a metal sheet such as aluminum, iron, copper or chromium; and a metal sheet covered with an oxide layer of the metal.

The surface 2a (the upper surface shown in FIG. 1) of the substrate 2 may be a smooth surface or a matted surface. The surface 2a of the substrate 2 may have an under coat layer for improving the adhesion with the stimulable phosphor layer 3, or may have a light reflecting layer for preventing the incidence of exciting light-passed through the substrate 2 into the stimulable phosphor layer 3.

The stimulable phosphor layer 3 contains a known phosphor, for example, CsBr:Eu, and it is formed by a vapor deposition method, for example, a vapor deposition method, a sputtering method, a CVD (Chemical Vapor Deposition) method, a PVD (Physical Vapor Deposition) method or an Ion plating method. The stimulable phosphor layer 3 may be a single layer or a laminated layer containing two or more layers.

Figure 2:
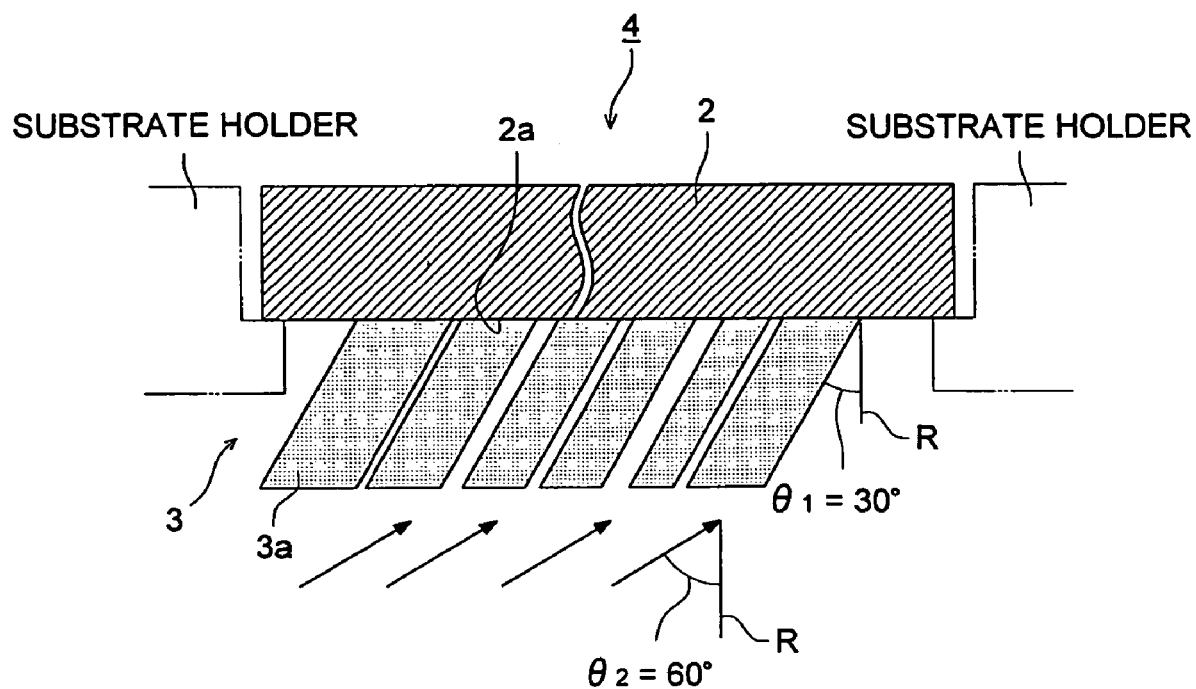
FIG. 2 is an enlarged cross-section view of stimulable phosphor panel 4.

FIG. 2 is an enlarged cross-section view of stimulable phosphor panel 4 illustrating a macroscopic view of the cross-section.

As shown in FIG. 2, the stimulable phosphor layer 3 is constituted by many columnar crystals 3a, 3a . . . of the stimulable phosphor arranged with a distance from each other, and the columnar crystals 3a are inclined making a designated angle with the normal line R of the surface 2a of the substrate 2.

The stimulable phosphor panel 4 having the above described structure is placed between a first moisture-proof protective film 10 provided on the stimulable phosphor layer 3 and a second moisture-proof protective film 20 provided beneath the substrate 3.

The first moisture-proof protective film 10 has the area slightly larger than that of the phosphor panel 4 and the circumference of the film is extended out from the circumference of the phosphor panel 4 in a situation of that the film substantially not adhering with the stimulable phosphor layer 3 of the phosphor panel 4. The situation that "the first moisture-proof film 10 substantially not adhering with the stimulable phosphor layer 3" is a situation in which the moisture-proof protective film 10 is not optically unified with the stimulable phosphor layer 3, in concrete, a situation in which the adhering area of the first moisture-proof protective film 10 with the stimulable phosphor layer 3 is not more than 10% of the area of the surface of the stimulable phosphor layer 3 (the surface facing to the first moisture-proof protective film 10).

The second moisture-proof protective film 20 also has area slightly larger than that of the phosphor panel 4 and the edge thereof is extended out form the circumference of the phosphor panel 4.

In the radiation image conversion panel 1, the entire surround edge of the first and second moisture-proof protective films 10, 20 are contacted with each other by fusion so that the phosphor panel 4 is completely sealed by the first and second moisture-proof protective films 10, 20. The phosphor panel 4 is completely protected from permeation of water by sealing by the first and second moisture-proof protective films 10, 20.

As is shown in the enlarged drawing, the first moisture-proof protective film 10 has a laminated structure containing a first layer 11, a second layer 12 and a third layer 13.

The first layer 11 is a layer facing to the stimulable phosphor layer 3 of the phosphor panel 4 through an air layer 14 and is constituted by a thermally fusible resin. For the thermally fusible resin, for example, ethylene-vinyl acetate copolymer (EVA), casting polypropylene (CPP) and polyethylene (PE) are employable.

The second layer 12 is a layer constituted by a metal oxide such as alumina and silica, which is deposited under the third layer 13 by a vapor deposition method. The second layer 12 may be omitted although the second layer 12 raises the anti-moisture ability of the first moisture-proof film The third layer 13 is laminated on the second layer 12, which is constituted by poly(ethylene terephthalate) (PET).

Thus prepared first moisture-proof protective film 10 having the second layer 12 which contains a metal oxide is excellent in processing and transparency. Also, properties of anti-moisture and anti-oxygen permeation of the first moisture-proof protective film 10 tend to be less influenced by temperature and humidity. Accordingly, the first moisture-proof protective film 10 is suitable for the medical use radiation image conversion panel 1 utilizing the stimulable phosphor which requires a stable image quality not influenced by environmental conditions.

On the third layer 13, the same layer as the first layer 11, the same layer as the second layer 12 and the same layer as the third layer 13; or one or more layers containing a resin different from that of the first layer 11 and the third layer 13 may be laminated.

When one or more layer which is the same as the second layer 12 containing a metal oxide such as alumina or silica is laminate on the third layer 13, the first moisture-proof protective film 10 exhibits a moisture-proof property corresponding to the number of the laminated layer which is the same as the second layer 12. Any known methods are applicable for laminating the second layer 12 or a layer the same as the second layer 12. Of these, a dry lamination method is preferable from the viewpoint of the production efficiency.

As is shown in the enlarged drawing displayed at the lower portion of FIG. 1, the second moisture-proof protective film 20 has a laminated structure containing a first layer 21, a second layer 22 and a third layer 23.

The first layer 21 is faced to the substrate 2 of the phosphor panel 4 through an air layer 24. The first layer 21 is constituted by a resin the same as that the first layer 11 of the first moisture-proof protective film 10, and is contacted by fusion with the first layer 11 of the first moisture-proof protective film 10 at the circumference portion thereof.

The second layer 22 is an aluminum layer laminated with underside of the first layer 21. The second layer raises the anti-moisture ability of the second moisture-proof protective film, though which may be omitted.

The third layer 23 is laminated on the underside of the second layer 22 in FIG. 1, which contains a resin such as PET.

On the third layer 23, the same layer as the first layer 21, the same layer as the second layer 22 and the same layer as the third layer 23; or one or more layers containing a resin different from that of the first layer 21 and the third layer 23 may be laminated.

The production method of the radiation image conversion panel 1 according to the present invention is described below.

FIG. 3 is a scheme displaying the production steps of the radiation image conversion panel 1.

Firstly, a designated substrate 2 is prepared and a stimulable phosphor layer 3 is formed on the substrate 2 by a known method such as a vapor deposition method or a coating method (hereafter this step is referred to as a "Stimulable phosphor layer forming step".

Figure 3A:
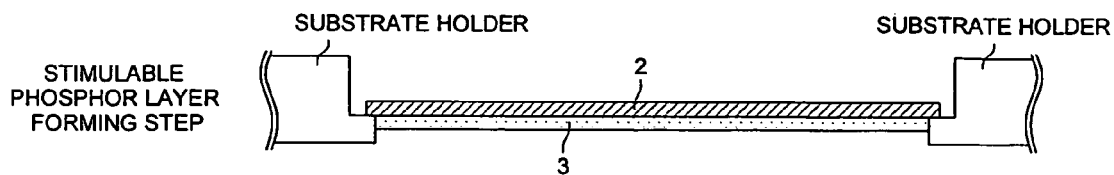
FIGS. 3(a) to 3(f) sequentially illustrate the production method of radiation image conversion panel 1.

For example, the formation of the stimulable phosphor layer 3 by an evaporation method among plural kinds of vapor deposition methods is described below. The substrate 2 is fixed on a substrate holder in an evaporation apparatus as shown in FIG. 3(a), and then the interior of the apparatus is evacuated to vacuum. After that, the stimulable phosphor as the vapor source is heated and evaporated by means of a resistant heating method or an electron beam method so as to grow the stimulable phosphor of a desired thickness on the surface 2a of the substrate 2. Thus the stimulable phosphor layer 3 is formed on the substrate 2.

Provided that the incidental angle of the vapor stream of the stimulable phosphor with the normal line R of the surface 2a of the substrate 2 is θ2 and the inclination angle of the columnar crystal 3a is θ1, as is shown in FIG. 2, the inclination angle θ1 is empirically a half of the incidental angle θ2. Consequently, columnar crystals 3a, 3a . . . having the inclination angle θ1 is formed corresponding to the incidental angle θ2. Namely, many columnar crystals 3a, 3a . . . having an inclination angel of 30° can be formed by supplying the vapor stream of the stimulable at an incidental angle of 60°.

For supplying the vapor of the stimulable phosphor at a designated angle, applicable are, for example, the following methods: (i) a method in which the substrate is set at an inclined angle with the vapor source, and (ii) a method in which the substrate 2 and the vapor source are set in parallel with each other and only the inclined component of the vapor stream is taken out from the vapor source by using a slit.

Figure 3B:
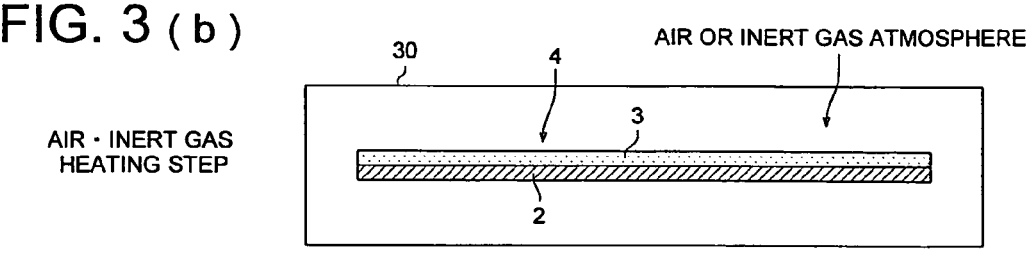

After the formation of the stimulable phosphor layer 3 on the substrate 2, the substrate 2 having the stimulable phosphor layer 3 (the phosphor panel 4) is set in a thermostatic container 30 and the inside atmosphere is changed to air or an inert gas, for example, nitrogen or argon (or the atmosphere may be a vacuum) as is shown in. FIG. 3(b), and then the phosphor panel 4 is heated at around 100° C. for a prescribed duration to dehydrate the columnar crystals 3a (hereafter this step is referred to as an "air•inert gas heating step").

Figure 3C:
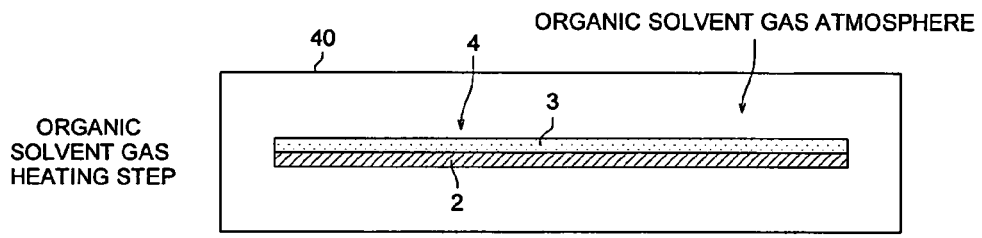

After the "air•inert gas heating step", the phosphor panel 4 is set in a thermostatic container 40 and the inside atmosphere is changed to an organic solvent gas as shown in FIG. 3(c), and the phosphor panel 4 is heated at 100° C. or more (preferably at 100° C. or more and at 160° C. or less) for a prescribed time (hereafter this step is referred to as an "organic solvent gas heating step").

The organic solvent to be employed in the organic solvent gas heating step will be described below.

The organic solvent is preferably a halogen-containing solvent. The halogen-containing solvent is a solvent containing a hydrocarbon compound in which at least one hydrogen atom is replaced with a halogen atom such as F, Cl, Br or I. The halogen-containing solvent may be a compound in which the atoms are bonded only saturated bonds, a compound containing a unsaturated bond, a cyclic compound, a chain compound, or a compound in which an atom or a group is replaced with a hydroxyl group, an ether group, a carbonyl group or a carboxyl group.

For the halogen-containing solvent, an nonflammable solvent having no firing point is preferably applied because (1) the solvent is used in the heating process (from the viewpoint of properties such as having no firing point are required by the fire laws relating to the flammability and the explosivility). In such the case, the heating temperature can be optionally decided without consideration of the kind of the halogen-containing solvent to be employed, and the heating is preferably performed at a temperature lower than the flash point.

Flon alternation compounds which are recently attracting attention are considered to be attractive candidates as organic solvents to be used in the present invention from the viewpoint of (2) the environmental suitability, (3) biological harmfulness as well as foregoing (1). Among them, HFE (hydrofluoroether) is suitably employed as a halogen-containing solvent, which is one of the newest flon alternation compounds superior in the above (2) and (3).

The HFE contains carbon atoms, fluorine atoms, hydrogen atoms and at least one ether oxygen atom, and may contain one or more hetero atoms such as a sulfur atom or a trivalent nitrogen atom combined in the main carbon chain. The HFE may be a straight-chain compound, a branched-chain compound, a cyclic compound or a compound constituted by a combination of the above, for example, an aliphatic alkyl cyclic compound. However, the HFE preferably contains no unsaturated bond.

A compound represented by the following Formula 1 can be employed as a concrete example of the HFE.

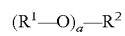

$(R^1-O)_a-R^2$     Formula 1

In the above Formula 1, "a" is an integer of from 1 to 3, and $R^1$ and $R^2$ each is an alkyl group or an aryl group which may be the same or different. At least one of $R^1$ and $R^2$ contains a fluorine atom and a hydrogen atom, one or both of $R^1$ and $R^2$ may contains a hetero atom in the chain thereof, and the total number of fluorine atoms in the HFE is preferably larger than the total number of hydrogen atoms in the HFE. $R^1$ and $R^2$ each may have a straight-chain, a branched chain or a cyclic group, and may contain one or more unsaturated carbon-carbon bonds. However, preferably, both of $R^1$ and $R^2$ only contain saturated bonds of atoms.

Examples of HFE having such the properties include Novec© HFE-7100, HFE-7100DL and HFE-7200, manufactured by Sumitomo 3M Co., Ltd., and HFE-S7 (commercial name), manufactured by Daikin Kogyo Co., Ltd. These HFEs available on the market can be suitably employed as the halogen-containing solvent employable in the heating steps.

Figure 3D:
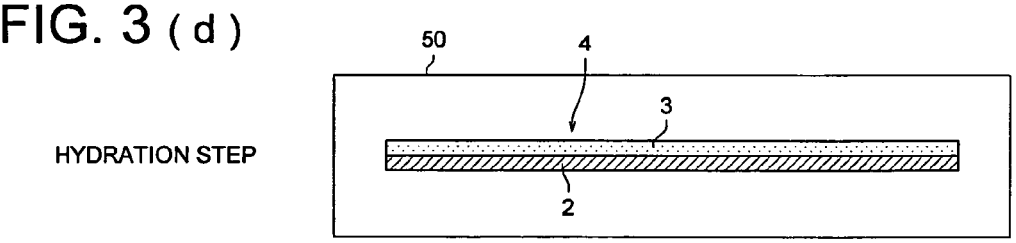

After the "organic solvent gas heating step", the phosphor panel 4 is set in a thermostatic container 50 as shown in FIG. 3(d) and the inside condition is set to a temperature of 23-60° C. and a relative humidity of 30-60%. The phosphor panel 4 is hydrated (or humidified) for 12 hours or more under the above condition (hereafter this step is referred to as a "hydration step").

Figure 3E:
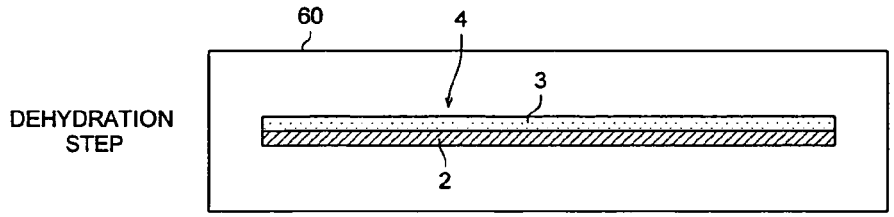
Figure 3F:
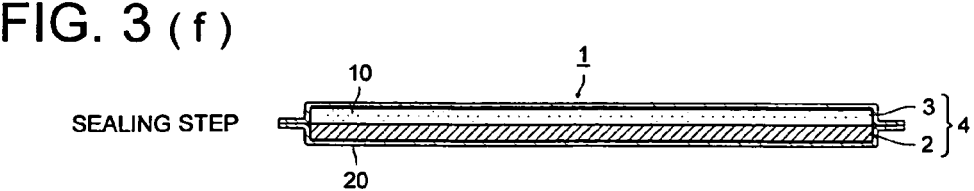

After the "hydration step", the phosphor panel 4 is set in a thermostatic container 60 as shown in FIG. 3(e) and the phosphor panel 4 is heated at 60-160° C. for a prescribed time to dehydrate the columnar crystals 3a of the stimulable phosphor layer 3, thus the phosphor panel 4 is dehydrated (hereafter this step is referred to as a "dehydration step").

In the dehydration step, the higher the heating temperature is set to in the range of 60-160° C., the faster the dehydration step is completed, and the luminance of the stimulable phosphor layer 3 and the quality of the image of the radiation image conversion panel 1 are increased.

When the temperature of the dehydration step is lower than 60° C., a longer heating duration is necessary to obtain the same effect as described above, although the same effect is possible to obtain, resulting in a lower productivity of the radiation image conversion panel 1. Accordingly the temperature is recommended to set at 60° C. or more. On the contrary, when the temperature of the dehydration step is set at more than 160° C., the columnar crystals 3a of the stimulable phosphor layer 3 tends to be damaged. Accordingly, the temperature is recommended to set at 160° C. or less.

After the dehydration step is over, the stimulable phosphor panel 4 is placed in between a first and a second moisture-proof protective films 10 and 20 and the first and the second moisture-proof protective films 10 and 20 are heated and fused each other at the circumference portion thereof using an impulse sealer to seal the phosphor panel 4 in the first and the second moisture-proof protective films 10 and 20 (hereafter, this step is referred to as a "sealing step").

EXAMPLE

In this example, a plurality of samples focusing on a radiation image conversion panel were prepared and a sensitivity (luminance of emission), a sharpness of an image and a degrading rate of luminance of each sample were measured and evaluated.

(1) Sample Preparation (1.1) Preparation of Phosphor Panels

A square-shaped aluminum plates of 20 cm×20 cm having a thickness of 500 μm was prepared for the substrate, and a light reflection layer was formed on one surface of each of the plates. The light reflection layer was formed by depositing titanium oxide, manufactured by Furuuchi Kagaku Co., Ltd., and zirconium oxide, manufactured by Furuuchi Kagaku Co., Ltd., on the substrate by a known vapor deposition apparatus.

Next, a stimulable phosphor composed of CsBr:Eu was deposited on the light reflection layer of the substrate to form a stimulable phosphor layer. In concrete, a substrate was fixed in a vacuum chamber of the vapor deposition apparatus so that the surface of the substrate on which the light reflection layer was formed was faced to the vapor source and the temperature in the vacuum chamber was raised to 240° C. Then, nitrogen gas was introduced into the vacuum chamber so that the pressure of inside of the vacuum chamber increased to 0.1 Pa. The distance between the vapor source and the substrate was 60 cm. An aluminum slit was arranged between the vapor source and the substrate so that the incident angle of the vapor of the stimulable phosphor with the normal line of the light reflection surface of the substrate was made to 30°. Thereafter, the vapor deposition was performed while the substrate was conveyed in the direction parallel to the surface to form a layer of columnar crystal of the stimulable phosphor having a thickness of 500 μm on the light reflection layer of the substrate. In the same manner, a plurality of phosphor panels were prepared.

(1.2) Preparation of Sample 1

A phosphor panel prepared in (1.1) was sealed by using two moisture-proof protective films to prepare Sample 1.

More specifically, a first moisture-proof protective film was prepared by laminating a 14 μm thick PET layer and a 30 μm thick CPP layer and a second moisture-proof protective layer was prepared by laminating a 188 μm thick PET layer and a 30 μm thick CPP layer. On a stimulable phosphor layer of the phosphor panel, a first moisture-proof protective film was provided so that the CPP layer of the first moisture-proof protective film faced to the stimulable phosphor layer, and, on the substrate of the phosphor panel, a second moisture-proof protective film was provided so that the CPP layer of the second moisture-proof protective film faced to the substrate. Then, the two moisture-proof protective films were piled each other. After that, while the space enclosed by the first and second moisture-proof protective films was being evacuated, the first and second moisture-proof protective films were fused each other at the circumference portion thereof by an impulse sealer to seal the phosphor panel by the first and second moisture-proof protective films. Thus Sample 1 was prepared.

On the occasion of sealing of the circumference of the first and second moisture-proof protective films, the impulse sealer having a heater of 3 mm was used and the sealing was performed so that the distance from the fused portion of the first and second moisture-proof protective films to the circumference was 3 mm.

(1.3) Preparation of Samples 2-4, 10-14, 20-22, 30, 31 and 40-45

Each of the phosphor panels prepared as described in above (1.1) was subjected to the treatments shown in Table 1 and sealed by using the two moisture-proof protective films as described in above (1.2). Thus, radiation image conversion panels, which were referred to as Samples 2-4, 10-14, 20-22, 30, 31 and 40-45, were prepared. In Table 1, "-" denotes that the step was eliminated.

In "Air·inert gas heating step" and "Organic solvent gas heating step", heat treatment was carried out for 60 minutes and in "Dehydration step", heat treatment was carried out for 30 minutes.

The pressure in "Organic solvent gas heating step" was atmospheric pressure and the organic solvents A-D were as follows:

A: Novec HFE-7100 ($C_4F_9OCH_3$), Sumitomo 3M Co., Ltd.
B: Zeorola H (cyclic $C_5H_3F_7$), Nihon Zeon Co., Ltd.
C: SC52S (HCBr type), Dipsol Co., Ltd.
D: Tetrachloromethane (CCl4)
E: SC52S (HCBr type), Dipsol Co., Ltd.

(2) Measurement of Luminance of Emission (Sensitivity)

Each of samples was irradiated with X-rays of a tube voltage of 80 kVp from the backside (the surface on which no stimulable phosphor layer was formed) of the sample. After that, the surface (the surface on which the stimulable phosphor layer was formed) of each of the samples was scanned by a semi-conductor laser for exciting the stimulable phosphor, and the light amount (intensity) of the light emitted from the stimulable phosphor layer was measured by a light receiving device (a photomultiplier having spectral sensitivity of S-5), and the measured value was defined as the "luminance of emission (sensitivity)". Results are listed in table 1. In Table 1, the values of Samples 2 through 45 are relative values when the sensitivity of Sample 1 is set at 1.0.

(3) Evaluation of Sharpness of an Image

The sharpness of an image of each sample was evaluated by the following method.

Each of Samples was irradiated with X-rays of a tube voltage of 80 kVp from the backside (the surface on which no stimulable phosphor layer was formed) through a lead MTF chart. After that, the surface (the surface on which the stimulable phosphor layer was formed) of the each of Samples was scanned by a He—Ne semiconductor laser for exciting the stimulable phosphor. The light emitted from the stimulable phosphor is received by a light receiving device (a photomultiplier having spectral sensitivity of S-5) and converted to electric signals. The electric signals were subjected to analog/digital conversion and recorded on a hard disc. Then the signals recorded on the hard disc were analyzed by a computer to determine the modulation transfer function (MTF) of the X-ray image recorded on the hard disc. The measured results represented by MTF (%) at a spatial frequency of 1 cycle/mm were listed in the following Table 1. In the results, a higher MTF value corresponds to a higher sharpness.

(4) Measurement of Luminance Degradation due to Moisture

Each sample was left for 50 days in a high temperature-high humidity condition of 40° C.-90% RH (relative humidity) and degradation of luminance of each sample after being left for 50 days in the high temperature-high humidity condition was measured. More specifically, the luminance of each sample was measured in the same manner as described in (2) before and after leaving for 50 days in the condition. Degradation of luminance was expressed as a relative value of the luminance after left for 50 days in the condition provided that the initial luminance was set to 100. The results were shown in Table 1. In Table 0.1, a higher relative value indicates that degradation of luminance is limited and a lower relative value indicates that degradation of luminance is large.

TABLE 1

| Sample No. | Air · inert gas heating step Atmosphere | Temp (° C.) | Organic Solvent gas heating step Org. Solv | Temp (° C.) | Hydration step RH (%) | Temp (° C.) | time (h) | Dehydration step Temp (° C.) | Luminance (Sensitivity) | Sharpness (MTF value) (%) | Luminance degradation due to humidity |
|---|---|---|---|---|---|---|---|---|---|---|---|
| 1 | — | — | — | — | — | — | — | — | 1.0 | 70 | 10 |
| 2 | air | 100 | — | — | — | — | — | — | 1.1 | 70 | 10 |
| 3 | $N_2$ | 100 | — | — | — | — | — | — | 1.1 | 70 | 5 |
| 4 | Ar | 100 | — | — | — | — | — | — | 1.1 | 70 | 7 |
| 10 | — | — | — | — | 20 | 45 | 12 | — | 1.0 | 70 | 7 |
| 11 | — | — | — | — | 30 | 45 | 12 | — | 1.1 | 70 | 58 |
| 12 | — | — | — | — | 45 | 45 | 12 | — | 1.1 | 70 | 60 |
| 13 | — | — | — | — | 60 | 45 | 12 | — | 1.1 | 70 | 62 |
| 14 | — | — | — | — | 70 | 45 | 12 | — | 0.8 | 68 | 62 |
| 20 | — | — | — | — | 45 | 45 | 12 | 60 | 1.3 | 71 | 64 |
| 21 | — | — | — | — | 45 | 45 | 12 | 100 | 1.3 | 72 | 65 |
| 22 | — | — | — | — | 45 | 45 | 12 | 160 | 1.3 | 71 | 65 |
| 30 | — | — | A | 140 | 45 | 45 | 12 | — | 1.8 | 78 | 86 |
| 31 | — | — | A | 140 | 45 | 45 | 12 | 100 | 1.9 | 80 | 90 |
| 40 | air | 100 | A | 140 | 55 | 25 | 24 | 100 | 1.9 | 83 | 93 |
| 41 | $N_2$ | 100 | A | 140 | 55 | 25 | 24 | 100 | 2.2 | 86 | 98 |
| 42 | Ar | 100 | A | 140 | 55 | 25 | 24 | 100 | 2.1 | 85 | 97 |
| 43 | $N_2$ | 100 | B | 140 | 55 | 25 | 24 | 100 | 1.9 | 80 | 96 |
| 44 | $N_2$ | 100 | C | 140 | 55 | 25 | 24 | 100 | 1.4 | 75 | 88 |
| 45 | $N_2$ | 100 | D | 140 | 55 | 25 | 24 | 100 | 1.2 | 73 | 86 |

Temp(° C.): Temperature(° C.),
Org. Solv: Organic Solvent,
RH(%): Relative humidity(%)
$N_2$: Nitrogen,
Ar: Argon As shown in Table 1, when Samples 2-4 which were heat treated only in the "air•inert gas heating step" and Samples 10-14, 20-22, 30, 31 and 40-45 which were humidified under 30 to 60% RH in the "humidification step", Samples 10-14, 20-22, 30, 31 and 40-45 were superior to Samples 2-4, in luminance, sharpness of an image and avoidance of degradation of luminance while being left in the high temperature-high humidity condition. As described above, advantage of humidification under 30-60% RH in a process of manufacturing a radiation image conversion panel has been clearly observed.

What is claimed is:

1. A method for producing a radiation image conversation panel comprising the steps of:
   forming a stimulable phosphor layer on a substrate by a vapor deposition method to prepare a phosphor panel;
   hydrating the phosphor panel under a relative humidity of 30 to 60%; and
   sealing the phosphor panel with a moisture-proof protective film to prepare the radiation image conversion panel.

2. The method of claim 1, further comprising the step of:
   dehydrating the phosphor panel by heating the phosphor panel at a temperature ranging from 60 to 160° C. after hydrating the phosphor panel.

3. The method of claim 1, further comprising the step of:
   heating the phosphor panel in an organic solvent gas before hydrating the phosphor panel.

4. The method of claim 3, wherein the organic solvent is a nonflammable fluorine-containing solvent.

5. A method for producing a radiation image conversation panel comprising the steps of in the order named:
   (i) forming a stimulable phosphor layer on a substrate by a vapor deposition method to prepare a phosphor panel;
   (ii) heating the phosphor panel in air or in an inert gas;
   (iii) heating the phosphor panel in an organic solvent gas;
   (iv) hydrating the phosphor panel under a relative humidity of 30 to 60%;
   (v) dehydrating the phosphor panel by heating the phosphor panel at 60 to 160° C.; and
   (vi) sealing the phosphor panel with a moisture-proof protective film to prepare the radiation image conversion panel.

6. The method of claim 5, wherein the organic solvent is a nonflammable fluorine-containing solvent.

* * * * *